(12) United States Patent
Håkansson et al.

(10) Patent No.: US 10,871,179 B2
(45) Date of Patent: *Dec. 22, 2020

(54) MECHANICAL LOCKING SYSTEM FOR BUILDING PANELS

(71) Applicant: VÄLINGE INNOVATION AB, Viken (SE)

(72) Inventors: Niclas Håkansson, Viken (SE); Darko Pervan, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,975

(22) Filed: Dec. 21, 2018

(65) Prior Publication Data

US 2019/0113061 A1 Apr. 18, 2019

Related U.S. Application Data

(63) Continuation of application No. 15/379,791, filed on Dec. 15, 2016, now Pat. No. 10,202,996, which is a
(Continued)

(51) Int. Cl.
*A47B 47/00* (2006.01)
*F16B 5/00* (2006.01)
(Continued)

(52) U.S. Cl.
CPC ........ *F16B 12/125* (2013.01); *A47B 47/0066* (2013.01); *A47B 47/0075* (2013.01);
(Continued)

(58) Field of Classification Search
CPC ... A47B 55/00; A47B 96/066; A47B 47/0066; A47B 47/0075; A47B 47/042;
(Continued)

(56) References Cited

U.S. PATENT DOCUMENTS

| 291,032 A | 1/1884 | Cleland | |
| 634,581 A * | 10/1899 | Miller | F16B 21/18 403/327 |

(Continued)

FOREIGN PATENT DOCUMENTS

| CH | 365 507 A | 11/1962 |
| CH | 685 276 A5 | 5/1995 |

(Continued)

OTHER PUBLICATIONS

U.S. Appl. 14/486,681, Hans Brännström, Agne Pålsson and Peter Derelöv, filed Sep. 15, 2014, (Cited herein as US Patent Application Publication No. 2015/0078807 A1 of Mar. 19, 2015).

(Continued)

*Primary Examiner* — Ryan D Kwiecinski
(74) *Attorney, Agent, or Firm* — Buchanan Ingersoll & Rooney P.C.

(57) ABSTRACT

Panels are shown which are provided with a mechanical locking system allowing perpendicular connection with a snap action. A set of panels including a first and a second panel, an edge of the second panel is insertable into a groove of the first panel, when the panels are arranged essential perpendicular to each other, to obtain a mechanical connection between the first and the second panel, when the second panel is displaced essentially perpendicularly to the first panel.

18 Claims, 11 Drawing Sheets

Related U.S. Application Data continuation of application No. 14/515,988, filed on Oct. 16, 2014, now Pat. No. 9,538,842, which is a continuation of application No. 13/464,512, filed on May 4, 2012, now Pat. No. 8,887,468.

(60) Provisional application No. 61/483,444, filed on May 6, 2011.

(51) Int. Cl.
  *F16B 12/12* (2006.01)
  *F16B 12/26* (2006.01)
  *A47B 47/04* (2006.01)

(52) U.S. Cl.
  CPC .......... *A47B 47/042* (2013.01); *F16B 5/0056* (2013.01); *F16B 12/26* (2013.01); *E04F 2201/0146* (2013.01); *E04F 2201/0523* (2013.01); *E04F 2201/0535* (2013.01); *Y10T 403/73* (2015.01)

(58) Field of Classification Search
  CPC ...... E04F 2201/0523; E04F 2201/0535; E04F 2201/0138; E04F 2201/0146; F16B 12/24; F16B 12/26; F16B 5/0056; F16B 5/0614; F16B 12/125; Y10T 403/73; Y10T 403/7096
  See application file for complete search history.

(56) References Cited

U.S. PATENT DOCUMENTS

| | | | |
|---|---|---|---|
| 701,000 A | 5/1902 | Ahrens | |
| 861,911 A * | 7/1907 | Stewart | A47B 47/03 312/263 |
| 881,673 A | 3/1908 | Ellison | |
| 1,533,099 A | 4/1925 | Carroll | |
| 1,534,468 A | 4/1925 | Shea, Jr. | |
| 1,800,386 A | 4/1931 | Hoffman | |
| 1,800,387 A | 4/1931 | Greist | |
| 1,802,245 A | 4/1931 | Foretich | |
| 1,954,242 A | 4/1934 | Heppenstall | |
| 2,360,451 A | 10/1944 | Stone | |
| 2,362,904 A | 11/1944 | Kramer | |
| 2,496,184 A | 1/1950 | Von Canon | |
| 2,681,483 A | 6/1954 | Morawetz | |
| 3,002,630 A | 10/1961 | Heisser | |
| 3,195,968 A | 7/1965 | Freeman | |
| 3,284,152 A * | 11/1966 | Schorghuber | F16B 12/02 312/257.1 |
| 3,313,054 A | 4/1967 | Madey | |
| 3,347,610 A | 10/1967 | Pilliod | |
| 3,410,441 A | 11/1968 | Rhyne | |
| 3,722,704 A | 3/1973 | Piretti | |
| 3,722,971 A | 3/1973 | Zeischegg | |
| 3,742,807 A | 7/1973 | Manning | |
| 3,765,465 A | 10/1973 | Gulistan | |
| 3,784,271 A | 1/1974 | Schreiber | |
| 3,884,002 A | 5/1975 | Logie | |
| 3,885,845 A | 5/1975 | Krieks | |
| 3,981,118 A | 9/1976 | Johnson et al. | |
| 4,089,614 A | 5/1978 | Harley | |
| 4,099,887 A | 7/1978 | Mackenroth | |
| 4,116,510 A | 9/1978 | Franco | |
| 4,142,271 A | 3/1979 | Busse | |
| 4,211,379 A | 7/1980 | Morgan et al. | |
| 4,222,544 A | 9/1980 | Crowder | |
| 4,279,397 A | 7/1981 | Larsson | |
| 4,299,067 A | 11/1981 | Bertschi | |
| 4,308,961 A | 1/1982 | Kunce | |
| 4,324,517 A | 4/1982 | Dey | |
| 4,403,886 A | 9/1983 | Haeusler | |
| 4,405,253 A | 9/1983 | Stockum | |
| 4,509,648 A | 4/1985 | Govang | |
| 4,593,734 A | 6/1986 | Wallace | |
| 4,595,105 A | 6/1986 | Gold | |
| 4,597,122 A | 7/1986 | Handler | |
| 4,615,448 A | 10/1986 | Johnstonbaugh | |
| 4,629,076 A | 12/1986 | Amstutz et al. | |
| 4,750,794 A | 6/1988 | Vegh | |
| 4,752,150 A | 6/1988 | Salice | |
| 4,815,908 A | 3/1989 | Duran et al. | |
| 4,817,900 A | 4/1989 | Whittington et al. | |
| 4,844,266 A | 7/1989 | Small et al. | |
| 4,883,331 A | 11/1989 | Mengel | |
| 4,886,326 A | 12/1989 | Kuzyk | |
| 4,888,933 A | 12/1989 | Guomundsson | |
| 4,891,897 A | 1/1990 | Gieske et al. | |
| 4,909,581 A | 3/1990 | Haheeb | |
| 4,938,625 A | 7/1990 | Matsui | |
| 4,944,416 A | 7/1990 | Petersen et al. | |
| 4,961,295 A | 10/1990 | Kosch, Sr. et al. | |
| 5,004,116 A | 4/1991 | Cattarozzi | |
| 5,018,323 A | 5/1991 | Clausen | |
| 5,109,993 A | 5/1992 | Hutchison | |
| 5,114,265 A | 5/1992 | Grisley | |
| 5,121,578 A | 6/1992 | Holz | |
| 5,125,518 A | 6/1992 | Ward | |
| 5,138,803 A | 8/1992 | Grossen | |
| 5,209,556 A | 5/1993 | Anderson | |
| 5,212,925 A | 5/1993 | McClinton | |
| 5,299,509 A | 4/1994 | Ballard | |
| 5,360,121 A | 11/1994 | Sothman | |
| 5,375,802 A | 12/1994 | Branham, II | |
| 5,423,155 A | 6/1995 | Bauer | |
| 5,451,102 A | 9/1995 | Chuan | |
| 5,458,433 A | 10/1995 | Statsny | |
| 5,471,804 A | 12/1995 | Winter, IV | |
| 5,475,960 A | 12/1995 | Lindal | |
| 5,499,667 A | 3/1996 | Nakanishi | |
| 5,499,886 A | 3/1996 | Short et al. | |
| 5,507,331 A | 4/1996 | Nakanishi | |
| 5,527,103 A | 6/1996 | Pittman | |
| 5,536,108 A * | 7/1996 | Kvalheim | E06B 3/984 108/180 |
| 5,658,086 A | 8/1997 | Brokaw et al. | |
| 5,711,115 A | 1/1998 | Wirt | |
| 5,775,521 A | 7/1998 | Tisbo | |
| 5,810,505 A | 9/1998 | Henriott | |
| 5,893,617 A | 4/1999 | Lee | |
| 5,941,026 A | 8/1999 | Eisenreich | |
| 5,944,294 A | 8/1999 | Baer | |
| 5,950,389 A | 9/1999 | Porter | |
| 6,045,290 A | 4/2000 | Nocievski | |
| 6,050,426 A | 4/2000 | Leurdijk | |
| 6,142,436 A | 11/2000 | Thurston et al. | |
| 6,312,186 B1 | 11/2001 | Röck et al. | |
| 6,349,507 B1 | 2/2002 | Muellerleile | |
| 6,363,645 B1 | 4/2002 | Hunter | |
| 6,413,007 B1 | 7/2002 | Lambright | |
| 6,418,683 B1 * | 7/2002 | Martensson | E04B 1/6129 52/282.1 |
| 6,491,172 B2 | 12/2002 | Chance | |
| 6,505,452 B1 | 1/2003 | Hannig | |
| 6,547,086 B1 | 4/2003 | Harvey | |
| 6,578,498 B1 | 6/2003 | Draudt et al. | |
| 6,675,979 B2 | 1/2004 | Taylor | |
| D486,676 S | 2/2004 | Campbell et al. | |
| 6,769,219 B2 | 8/2004 | Schwitte et al. | |
| 6,772,890 B2 | 8/2004 | Campbell et al. | |
| 6,827,028 B1 | 12/2004 | Callaway | |
| 6,971,614 B2 | 12/2005 | Fischer et al. | |
| 7,127,860 B2 | 10/2006 | Pervan | |
| 7,223,045 B2 | 5/2007 | Migli | |
| 7,228,977 B2 | 6/2007 | Perkins et al. | |
| 7,300,120 B2 | 11/2007 | Shin | |
| 7,451,535 B2 | 11/2008 | Wells et al. | |
| 7,451,578 B2 | 11/2008 | Hannig | |
| 7,584,583 B2 | 9/2009 | Bergelin et al. | |
| 7,614,350 B2 | 11/2009 | Tuttle et al. | |
| 7,621,092 B2 | 11/2009 | Groeke et al. | |
| 7,641,414 B1 | 1/2010 | Joyce | |
| 7,717,278 B2 | 5/2010 | Kao | |

(56) References Cited

U.S. PATENT DOCUMENTS

| | | | |
|---|---|---|---|
| 7,721,503 B2 | 5/2010 | Pervan et al. | |
| 7,793,450 B2 | 9/2010 | Chasmer et al. | |
| 7,818,939 B2 | 10/2010 | Bearinger | |
| 7,998,549 B2 | 8/2011 | Susnjara | |
| 8,033,074 B2 | 10/2011 | Pervan | |
| 8,038,363 B2 | 10/2011 | Hannig | |
| 8,042,311 B2 | 10/2011 | Pervan | |
| 8,146,754 B2 | 4/2012 | Apgood | |
| 8,220,217 B2 | 7/2012 | Muehlebach | |
| 8,234,830 B2 | 8/2012 | Pervan | |
| 8,365,499 B2 | 2/2013 | Nilsson et al. | |
| 8,387,327 B2 | 3/2013 | Pervan | |
| 8,464,408 B2 | 6/2013 | Hazzard | |
| 8,495,849 B2 | 7/2013 | Pervan | |
| 8,505,257 B2 | 8/2013 | Boo et al. | |
| 8,544,230 B2 | 10/2013 | Pervan | |
| 8,596,013 B2 | 12/2013 | Boo | |
| 8,602,227 B1 | 12/2013 | McDonald | |
| 8,615,952 B2 | 12/2013 | Engström | |
| 8,713,886 B2 | 5/2014 | Pervan | |
| 8,745,952 B2 | 6/2014 | Perra | |
| 8,764,137 B2 | 7/2014 | Fehre | |
| 8,776,473 B2 | 7/2014 | Pervan | |
| 8,833,028 B2 | 9/2014 | Whispell et al. | |
| 8,864,407 B1 | 10/2014 | Sorum | |
| 8,882,416 B2 | 11/2014 | Baur et al. | |
| 8,887,468 B2 | 11/2014 | Håkansson et al. | |
| 9,175,703 B2* | 11/2015 | Maertens | E04F 13/08 |
| 9,216,541 B2 | 12/2015 | Boo | |
| 9,290,948 B2 | 3/2016 | Cappelle et al. | |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,745,756 B2 | 8/2017 | Hannig | |
| 9,809,983 B2 | 11/2017 | Trudel | |
| 9,945,121 B2 | 4/2018 | Derelöv | |
| 10,034,541 B2 | 7/2018 | Boo et al. | |
| 10,202,996 B2 | 2/2019 | Håkansson et al. | |
| 10,378,570 B2 | 8/2019 | Broughton | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelöv et al. | |
| 10,669,716 B2 | 6/2020 | Derelöv et al. | |
| 10,670,064 B2 | 6/2020 | Derelöv et al. | |
| 10,830,268 | 11/2020 | Boo | |
| 2002/0170258 A1 | 11/2002 | Schwitte et al. | |
| 2004/0165946 A1 | 8/2004 | Areh et al. | |
| 2005/0042027 A1 | 2/2005 | Migli | |
| 2005/0236544 A1 | 10/2005 | Mancino | |
| 2005/0247653 A1 | 11/2005 | Brooks | |
| 2006/0091093 A1 | 5/2006 | Armari | |
| 2006/0101769 A1* | 5/2006 | Pervan | F16B 5/0076 52/591.1 |
| 2006/0180561 A1 | 8/2006 | Wisnoski et al. | |
| 2006/0236642 A1 | 10/2006 | Pervan | |
| 2006/0273085 A1 | 12/2006 | Casto | |
| 2007/0006543 A1 | 1/2007 | Engström | |
| 2007/0028547 A1 | 2/2007 | Grafenauer et al. | |
| 2008/0010937 A1 | 1/2008 | Pervan et al. | |
| 2008/0066415 A1 | 3/2008 | Pervan | |
| 2008/0193209 A1 | 8/2008 | Henderson | |
| 2008/0216435 A1 | 9/2008 | Nolan | |
| 2008/0236088 A1 | 10/2008 | Hannig et al. | |
| 2008/0244882 A1 | 10/2008 | Woxman et al. | |
| 2009/0014401 A1 | 1/2009 | Tallman | |
| 2009/0064624 A1 | 3/2009 | Sokol | |
| 2010/0028592 A1 | 2/2010 | Barkdoll et al. | |
| 2010/0083603 A1 | 4/2010 | Goodwin | |
| 2010/0104354 A1 | 4/2010 | Spalding | |
| 2010/0173122 A1 | 7/2010 | Susnjara | |
| 2010/0289389 A1 | 11/2010 | Crabtree, II | |
| 2011/0023303 A1 | 2/2011 | Pervan et al. | |
| 2011/0225921 A1 | 9/2011 | Schulte | |
| 2011/0225922 A1 | 9/2011 | Pervan et al. | |
| 2011/0280655 A1 | 11/2011 | Maertens et al. | |
| 2011/0283650 A1 | 11/2011 | Pervan et al. | |
| 2012/0009383 A1 | 1/2012 | Hardesty | |
| 2012/0027967 A1 | 2/2012 | Maertens et al. | |
| 2012/0073235 A1 | 3/2012 | Hannig | |
| 2012/0124932 A1 | 5/2012 | Schulte et al. | |
| 2012/0145845 A1 | 6/2012 | Hightower | |
| 2012/0180416 A1 | 7/2012 | Perra et al. | |
| 2012/0279161 A1 | 11/2012 | Håkansson et al. | |
| 2012/0286637 A1 | 11/2012 | Fehre | |
| 2013/0014463 A1 | 1/2013 | Pervan | |
| 2013/0048632 A1 | 2/2013 | Chen | |
| 2013/0071172 A1 | 3/2013 | Maertens et al. | |
| 2013/0081349 A1 | 4/2013 | Pervan | |
| 2013/0097846 A1 | 4/2013 | Pettigrew | |
| 2013/0111845 A1 | 5/2013 | Pervan | |
| 2013/0170904 A1 | 7/2013 | Cappelle et al. | |
| 2013/0232905 A2 | 9/2013 | Pervan | |
| 2013/0287484 A1 | 10/2013 | Phillips | |
| 2014/0013919 A1 | 1/2014 | Gerke et al. | |
| 2014/0055018 A1 | 2/2014 | Shein et al. | |
| 2014/0111076 A1 | 4/2014 | Devos | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2015/0330088 A1* | 11/2015 | Derelöv | E04F 15/02038 52/588.1 |
| 2016/0007751 A1 | 1/2016 | Derelöv | |
| 2016/0174704 A1 | 6/2016 | Boo et al. | |
| 2016/0270531 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |
| 2017/0360193 A1 | 12/2017 | Boo et al. | |
| 2018/0080488 A1 | 3/2018 | Derelöv | |
| 2018/0087552 A1 | 3/2018 | Derelöv et al. | |
| 2018/0112695 A1 | 4/2018 | Boo et al. | |
| 2018/0119717 A1 | 5/2018 | Derelöv | |
| 2018/0202160 A1 | 7/2018 | Derelöv | |
| 2018/0328396 A1 | 11/2018 | Fransson et al. | |
| 2019/0166989 A1 | 6/2019 | Boo et al. | |
| 2019/0191870 A1 | 6/2019 | Derelöv | |
| 2019/0195256 A1 | 6/2019 | Derelöv | |
| 2019/0289999 A1 | 9/2019 | Derelöv et al. | |
| 2019/0320793 A1 | 10/2019 | Boo | |
| 2019/0323532 A1 | 10/2019 | Boo | |
| 2019/0323533 A1 | 10/2019 | Boo | |
| 2019/0323534 A1 | 10/2019 | Derelöv | |
| 2019/0323535 A1 | 10/2019 | Derelöv | |
| 2020/0003242 A1 | 1/2020 | Brännström et al. | |
| 2020/0055126 A1 | 2/2020 | Fridlund | |
| 2020/0069048 A1 | 3/2020 | Derelöv et al. | |
| 2020/0069049 A1 | 3/2020 | Derelöv et al. | |
| 2020/0102978 A1 | 4/2020 | Fridlund | |
| 2020/0121076 A1 | 4/2020 | Derelöv et al. | |
| 2020/0214447 A1 | 7/2020 | Derelöv et al. | |
| 2020/0300284 A1 | 9/2020 | Pervan | |
| 2020/0337455 A1 | 10/2020 | Boo et al. | |
| 2020/0340513 | 10/2020 | Derelöv | |

FOREIGN PATENT DOCUMENTS

| | | | |
|---|---|---|---|
| CH | 696 889 A5 | 1/2008 | |
| CH | 696889 A5 * | 1/2008 | F16B 5/0614 |

(56) References Cited

FOREIGN PATENT DOCUMENTS

| | | |
|---|---|---|
| CH | 698 988 B1 | 12/2009 |
| CN | 101099618 A | 1/2008 |
| DE | 1107910 B | 5/1961 |
| DE | 24 14 104 A1 | 10/1975 |
| DE | 25 14 357 A1 | 10/1975 |
| DE | 31 03 281 A1 | 8/1982 |
| DE | 228 872 A1 | 10/1985 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2005 019 986 U1 | 2/2006 |
| DE | 20 2004 017 486 U1 | 4/2006 |
| DE | 20 2009 008 825 U1 | 10/2009 |
| DE | 10 2008 035 293 A1 | 2/2010 |
| DE | 10 2009 041 142 A1 | 3/2011 |
| DE | 10 2013 008 595 A1 | 11/2013 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 1 048 423 A2 | 11/2000 |
| EP | 1 048 423 B9 | 5/2005 |
| EP | 1 650 375 A1 | 4/2006 |
| EP | 1 671 562 A1 | 6/2006 |
| EP | 1 650 375 A8 | 9/2006 |
| EP | 1 922 954 A1 | 5/2008 |
| EP | 2 017 403 A2 | 1/2009 |
| EP | 1 922 954 B1 | 7/2009 |
| EP | 2 333 353 A2 | 6/2011 |
| EP | 1 863 984 B1 | 11/2011 |
| EP | 2 487 373 A1 | 8/2012 |
| FR | 2 517 187 A1 | 6/1983 |
| FR | 2 597 173 A1 | 10/1987 |
| FR | 2 602 013 A1 | 1/1988 |
| GB | 245332 | 1/1926 |
| GB | 1 022 377 A | 3/1966 |
| GB | 2 163 825 A | 3/1986 |
| GB | 2 315 988 A | 2/1998 |
| GB | 2 445 954 A | 7/2008 |
| GB | 2 482 213 A | 1/2012 |
| JP | S53-113160 U | 9/1978 |
| JP | H06-22606 U | 3/1994 |
| JP | 2003-239921 A | 8/2003 |
| KR | 10-1147274 B1 | 5/2012 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/53628 A1 | 7/2001 |
| WO | WO 02/055809 A1 | 7/2002 |
| WO | WO 02/055810 A1 | 7/2002 |
| WO | WO 03/083234 A1 | 10/2003 |
| WO | WO 2004/079130 A1 | 9/2004 |
| WO | WO 2005/068747 A1 | 7/2005 |
| WO | WO 2006/043893 A1 | 4/2006 |
| WO | WO 2006/104436 A1 | 10/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/150234 A1 | 12/2008 |
| WO | WO 2010/087752 A1 | 8/2010 |
| WO | WO 2011/151758 A2 | 12/2011 |
| WO | WO 2011/151758 A3 | 12/2011 |
| WO | WO-2011151737 A2 * | 12/2011 | ............ F16B 5/0004 |
| WO | WO-2011151758 A2 * | 12/2011 | ............ F16B 5/0016 |
| WO | WO 2012/095454 A1 | 7/2012 |
| WO | WO-2012095454 A1 * | 7/2012 | ........... A47B 87/008 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/118075 A1 | 8/2013 |
| WO | WO-2013118075 A1 * | 8/2013 | ............. F16B 12/46 |

OTHER PUBLICATIONS

U.S. Appl. 14/573,572, Christian Boo, filed Dec. 17, 2014, (Cited herein as US Patent Application Publication No. 2015/0198191 A1 of Jul. 16, 2015).
U.S. Appl. 15/271,622, Peter Derelöv and Mats Nilsson, filed Sep. 21, 2016, (Cited herein as US Patent Application Publication No. 2017/0079433 A1 of Mar. 23, 2017).
U.S. Appl. 15/308,872, Darko Pervan, filed Nov. 4, 2016, (Cited herein as US Patent Application Publication No. 2017/0089379 A1 of Mar. 30, 2017).
U.S. Appl. 15/415,356, Peter Derelöv and Christian Boo, filed Jan. 25, 2017, (Cited herein as US Patent Application Publication No. 2017/0208938 A1 of Jul. 27, 2017).
U.S. Appl. 15/422,798, Magnus Fridlund, filed Feb. 2, 2017, (Cited herein as US Patent Application Publication No. 2017/0227035 A1 of Aug. 10, 2017).
U.S. Appl. 15/428,469, Magnus Fridlund, filed Feb. 9, 2017, (Cited herein as US Patent Application Publication No. 2017/0227032 A1 of Aug. 10, 2017).
U.S. Appl. 15/428,504, Christian Boo, filed Feb. 9, 2017, (Cited herein as US Patent Application Publication No. 2017/0227031 A1 of Aug. 10, 2017).
U.S. Appl. 15/432,190, Magnus Fridlund, filed Feb. 14, 2017, (Cited herein as US Patent Application Publication No. 2017/0234346 A1 of Aug. 17, 2017).
U.S. Appl. 15/642,757, Peter Derelöv, filed Jul. 6, 2017, (Cited herein as US Patent Application Publication No. 2017/0298973 A1 of Oct. 19, 2017).
U.S. Appl. 15/646,714, Peter Derelöv, filed Jul. 11, 2017, (Cited herein as US Patent Application Publication No. 2018/0087552 A1 of Mar. 29, 2018).
U.S. Appl. 15/562,254, Peter Derelöv, filed Sep. 27, 2017, (Cited herein as US Patent Application Publication No. 2018/0080488 A1 of Mar. 22, 2018).
U.S. Appl. 15/567,507, Christian Boo, Peter Derelöv, and Agne Pålsson, filed Oct. 18, 2017, (Cited herein as US Patent Application Publication No. 2018/0112695 A1 of Apr. 26, 2018).
U.S. Appl. 15/794,491, Peter Derelöv, filed Oct. 26, 2017, (Cited herein as US Patent Application Publication No. 2018/0119717 A1 of May 3, 2018).
U.S. Appl. 15/923,701, Peter Derelöv, filed Mar. 16, 2018, (Cited herein as US Patent Application Publication No. 2018/0202160 A1 of Jul. 19, 2018).
U.S. Appl. 15/978,630, Jonas Fransson, Niclas Håkansson and and Agne Pålsson, filed May 14, 2018, (Cited herein as US Patent Application Publication No. 2018/0328396 A1 of Nov. 15, 2018).
U.S. Appl. No. 15/956,949, Peter Derelöv, filed Apr. 19, 2018.
U.S. Appl. No. 16/027,479 Christian Boo and Peter Derelöv Jul. 5, 2018.
U.S. Appl. No. 16/220,574, Peter Derelöv, filed Dec. 14, 2018.
U.S. Appl. No. 16/220,585, Peter Derelöv, filed Dec. 14, 2018.
U.S. Appl. No. 16/361,609, Peter Derelöv, Johan Svensson and Lars Gunnarsson, filed Mar. 22, 2019.
U.S. Appl. No. 16/386,732, Christian Boo, filed Apr. 17, 2019.
U.S. Appl. No. 16/386,810, Christian Boo, filed Apr. 17, 2019.
U.S. Appl. No. 16/386,824, Christian Boo, filed Apr. 17, 2019.
U.S. Appl. No. 16/386,874, Peter Derelöv, filed Apr. 17, 2019.
U.S. Appl. No. 15/956,949, Derelöv
U.S. Appl. No. 16/027,479, Boo, et al.
U.S. Appl. No. 16/220,574, Derelöv.
U.S. Appl. No. 16/220,585, Derelöv
U.S. Appl. No. 16/361,609, Derelöv et al.
U.S. Appl. No. 16/386,732, Boo.

(56) References Cited

OTHER PUBLICATIONS

U.S. Appl. No. 16/386,810, Boo.
U.S. Appl. No. 16/386,824, Boo.
U.S. Appl. No. 16/386,874, Derelöv
International Search Report dated Aug. 2, 2012 in PCT/SE2012/050475, Swedish Patent Office, Stockholm, Sweden, 8 pages.
Extended European Search Report issued in EP Patent Application No. 12782144.5, dated Aug. 14, 2014, European Patent Office, Munich, DE, 9 pages.
Extended European Search Report issued in EP Patent Application No. 17202290.7, dated Feb. 12, 2018, European Patent Office, Munich, DE, 10 pages.
Derelöv, Peter, U.S. Appl. No. 15/956,949 entitled "Panels for an Assembled Product", filed in the U.S. Patent and Trademark Office on Apr. 19, 2018.
Boo, Christian, et al., U.S. Appl. No. 16/027,479 entitled "Panels Comprising a Mechanical Locking Device and an Assembled Product Comprising the Panels," filed in the U.S. Patent and Trademark Office on Jul. 5, 2018.
Derelöv, Peter, U.S. Appl. No. 16/220,574 entitled "Set of Panels," filed in the U.S. Patent and Trademark Office on Dec. 14, 2018.
Derelöv, Peter, U.S. Appl. No. 16/220,585 entitled "Set of Panels," filed in the U.S. Patent and Trademark Office on Dec. 14, 2018.
Derelöv, Peter, et al., U.S. Appl. No. 16/361,609 entitled "Panels Comprising a Mechanical Locking Device and an Assembled Product Comprising the Panels," filed in the U.S. Patent and Trademark Office on Mar. 22, 2019.
Boo, Christian, U.S. Appl. No. 16/386,732 entitled "Set of Panels With a Mechanical Locking Device," filed in the U.S. Patent and Trademark Office on Apr. 17, 2019.
Boo, Christian, U.S. Appl. No. 16/386,810 entitled "Set of Panels With a Mechanical Locking Device," filed in the U.S. Patent and Trademark Office on Apr. 17, 2019.
Boo, Christian, U.S. Appl. No. 16/386,824 entitled "Set of Panels With a Mechanical Locking Device," filed in the U.S. Patent and Trademark Office on Apr. 17, 2019.
Derelöv, Peter, U.S. Appl. No. 16/386,874 entitled "Symmetric Tongue and T-Cross," filed in the U.S. Patent and Trademark Office on Apr. 17, 2019.
U.S. Appl. No. 16/564,438, Hans Brännström, Agne Pålsson and Peter Derelöv, filed Sep. 9, 2019, (Cited herein as US Patent Application Publication No. 2020/0003242 A1 of Jan. 2, 2020).
U.S. Appl. No. 16/553,325 Peter Derelöv and Johan Svensson, filed Aug. 28, 2019.
U.S. Appl. No. 16/553,350, Peter Derelöv and Johan Svensson, filed Aug. 28, 2019.
U.S. Appl. No. 16/567,436 Peter Derelöv and Mats Nilsson, filed Sep. 11, 2019.
U.S. Appl. No. 16/663,603 Magnus Fridlund, filed Oct. 25, 2019.
U.S. Appl. No. 16/697,335, Christian Boo and Peter Derelöv, filed Nov. 27, 2019.
U.S. Appl. No. 16/703,077, Magnus Fridlund, filed Dec. 4, 2019.
U.S. Appl. No. 16/722,096, Peter Derelöv and Christian Boo, filed Dec. 20. 2019.
U.S. Appl. No. 16/553,325, Derelöv et al.
U.S. Appl. No. 16/553,350, Derelöv et al.
U.S. Appl. No. 16/567,436, Derelöv.
U.S. Appl. No. 16/663,603, Fridlund.
U.S. Appl. No. 16/697,335, Boo et al.
U.S. Appl. No. 16/703,077, Fridlund.
U.S. Appl. No. 16/722,096, Derelöv et al.
Derelöv, Peter, U.S. Appl. No. 16/553,325, entitled "Set of Panels with a Mechanical Locking Device," filed in the U.S. Patent and Trademark Office on Aug. 28, 2019.
Derelöv, Peter, U.S. Appl. No. 16/553,350 entitled "Set of Panels with a Mechanical Locking Device," filed in the U.S. Patent and Trademark Office on Aug. 28, 2019.
Derelöv, Peter, U.S. Appl. No. 16/567,436 entitled "Panels Comprising a Mechanical Locking Device and an Assembled Product Comprising the Panels," filed in the U.S. Patent and Trademark Office on Sep. 11, 2019.
Fridlund, Magnus, U.S. Appl. No. 16/663,603 entitled "Element and Method for Providing Dismantling Groove," filed in the U.S. Patent and Trademark Office on Oct. 25, 2019.
Boo, Christian, et al., U.S. Patent Application No. 16/697,335 entitled "Panels Comprising a Mechanical Locking Device and an Assembled Product Comprising the Panels," filed in the U.S. Patent and Trademark Office on Nov. 27, 2019.
Fridlund, Magnus, U.S. Appl. No. 16/703,077 entitled "Set of Panels for an Assembled Product," filed in the U.S. Patent and Trademark Office Dec. 4, 2019.
Derelöv, Peter, et al., U.S. Appl. No. 16/722,096 entitled "Panels Comprising a Mechanical Locking Device and an Assembled Product Comprising the Panels," filed in the U.S. Patent and Trademark Office on Dec. 20, 2019.
Extended European Search Report issued in EP Patent Application No. 19217996.8, dated Jan. 31, 2020, European Patent Office, Munich, DE, 11 pages.
U.S. Appl. No. 16/861,639, Peter Derelöv.
Derelöv, Peter, U.S. Appl. No. 16/861,639 entitled "Panels Comprising a Mechanical Locking Device and an Assembled Product Comprising the Panels," filed in the U.S. Patent and Trademark Office on Apr. 29, 2020.
U.S. Appl. No. 16/861,639, Derelöv.
U.S. Appl. No. 16/946,047, Darko Pervan, filed Jun. 4, 2020.
U.S. Appl. No. 16/915,258, Hans Brännström, Agne Pålsson and Peter Derelöv, filed Jun. 29, 2020.
Pervan, Darko, U.S. Appl. No. 16/946,047 entitled "Mechanical Locking System for Building Panels," filed in the U.S. Patent and Trademark Office on Jun. 4, 2020.
Brännström, Hans, et al., U.S. Appl. No. 16/915,258 entitled "Assembled Product and Method of Assembling the Assembled Product," filed in the U.S. Patent and Trademark Office on Jun. 29, 2020.
U.S. Appl. No. 16/946,047, Pervan.
U.S. Appl. No. 16/915,258, Brännström et al.

* cited by examiner

MECHANICAL LOCKING SYSTEM FOR BUILDING PANELS

CROSS REFERENCE TO RELATED APPLICATIONS

The present application is a continuation of U.S. patent application Ser. No. 15/379,791, filed on Dec. 15, 2016, which is a continuation of Ser. No. 14/515,988, filed on Oct. 16, 2014, now U.S. Pat. No. 9,538,842, which is a continuation of U.S. application Ser. No. 13/464,512, filed on May 4, 2012, now U.S. Pat. No. 8,887,468, which claims the benefit of U.S. Provisional Application No. 61/483,444, filed on May 6, 2011. The entire contents of each of U.S. application Ser. No. 15/379,791, U.S. application Ser. No. 13/464,512, U.S. Provisional Application No. 61/483,444 and Swedish Application No. 1150400-8 are hereby incorporated herein by reference.

TECHNICAL FIELD

The disclosure relates to the field of mechanical locking systems for building panels, especially furniture components with mechanical locking systems, which are intended to lock preferably perpendicular to each other.

FIELD OF APPLICATION OF THE INVENTION

Embodiments of the present invention are particularly suitable for use in furniture components, which are preferably formed of sheet shaped panels and which are joined mechanically with a locking system integrated with the panel, i.e. mounted at the factory. The following description of known technology, problems of known systems and objects and features of the invention will therefore, as a non-restrictive example, be aimed above all at this field of application and in particular at furniture components formed as rectangular panels intended to be mechanically joined on one pair of opposite edges perpendicularly to other adjacent panels. The panels may also be square.

It should be emphasized that the invention can be applied to any type of sheet shaped panel such as for example wood based HDF, particle board and plywood, plastic sheet shaped materials, mineral fibre and metal based materials, stone and ceramics and similar. It may be used to connect furniture components, and elements for packaging boxes and similar. It may also be used to lock components, which for example have a cylinder form such as table legs.

BACKGROUND OF THE INVENTION

Furniture such as kitchen cabinets, bookshelves, drawers, tables and similar are generally supplied as flat components in order to save transportation costs. The customer must assemble them. Several methods are used to assemble such furniture components, for example, glue, spikes, screws and similar. Snapping connections comprising plastic components are widely used to connect, for example, drawers.

Known Technology and Problems Thereof

There are a lot of problems connected with the assembly of furniture components especially when one panel should be connected perpendicularly to another panel. Generally special connection devices are supplied that have to be inserted into grooves and holes. Such assembly is complicated and time consuming and the connection is often not strong enough. Snapping connections formed in plastic materials are expensive and complicated to produce. It would be an advantage if assembly may be simplified and if no loose parts would be needed in order to connect panels to each other in a firm, cost efficient and rigid manner.

WO 2010/070472 describes locking systems that may be used to assemble furniture components with angling and snapping. The locking systems may be formed in one piece with the panel or, alternatively, a separate plastic tongue with an outer flexible snap tab may be used. Such locking systems do not give sufficient strength and rigidity especially when rather soft core materials, such as particleboard, are used. The locking system is complicated to produce since the flexible tongue cannot be connected to the components with a linear displacement into a groove. The outer flexible part is generally not strong enough to provide a rigid connection.

SUMMARY OF THE INVENTION

A basic objective of embodiments of the present invention is to provide an improved mechanical locking system which may be produced in a cost effective way and which allows preferably rectangular panels to be connected and assembled mechanically perpendicularly to each other with a strong locking and in a simple manner without the need for loose parts that has to be used during assembly.

The above objects of embodiments of the invention are achieved wholly or partly by mechanical locking systems and panels, according to the independent claim that provide a stronger and easier locking. Embodiments of the invention are evident from the dependent claims and from the description and drawings.

A first aspect of the invention is a set of panels comprising a first and a second panel. An edge of the second panel is insertable into a groove of the first panel, when the panels are arranged essential perpendicular to each other, to obtain a mechanical connection between the first and the second panel, when the second panel is displaced essentially perpendicularly to the first panel. The edge comprises a separate and flexible tongue and said groove comprises a tongue groove, or said edge comprises a tongue groove and said groove comprises a separate and flexible tongue. The separate and flexible tongue is insertable into the tongue groove for connecting said panels to each other in a first direction, which is parallel to a main plane of the first panel. The edge of the second panel is configured to cooperate with the groove of the first panel for connecting said panels to each other in a second direction, which is parallel to a main plane (MP) of the second panel. The length direction of the separate and flexible tongue extends parallel with said edge and/or groove. The groove preferably comprises an opening, two sidewalls and a bottom. The separate and flexible tongue is arranged in an insertion groove. The separate and flexible tongue has an inner part mounted in the insertion groove and an outer part extending outside an opening of the insertion groove. A part of the separate tongue is displaced in the insertion groove during locking. The flexible tongue is preferably displaceable inwardly towards a bottom of the insertion groove and outwardly into the tongue groove during locking.

The tongue may comprise two opposite displacement surfaces located between the inner and outer parts of the separate and flexible tongue. One or both of said two opposite displacement surfaces may be displaceable against a wall(s) of the insertion groove during locking.

A locking involving displacement of a displacement surface against an upper or lower wall of the insertion groove may make it possible use a tongue with a rigid outer part. That may facilitate a strong locking even in rather soft materials such a particle boards that are often used a base material in furniture components. The outer rigid part may be displaced into a rather deep tongue groove and a firm locking may be obtained.

Said insertion groove may be inclined upwards with the opening closer to the main plane of the panel than the inner part of the insertion groove. Such inclination may facilitate the insertion of the separate tongue into the insertion groove during production since the tongue may be inserted with a linear motion into the displacement groove.

The separate and flexible tongue may, when the edge of the second panel is inserted into the groove of the first panel, lock by snapping.

The inner part may be fixed in the insertion groove by e.g. friction connection or by glue.

The inner part of the tongue may comprise one or several flexible protrusions extending in the length direction of the tongue.

The first and/or the second panel may comprise separate materials that form an edge or a groove portion. A particleboard panel may be reinforced with solid wood, plywood, HDF and similar wood based materials that are glued or mechanically connected to the panels in order to form at least a part of the locking system.

The second panel may have an outer edge with a smaller thickness than the thickness of the panel body such that the panel body overlaps one or both parts of the groove opening when the second panel is inserted into the groove of the first panel.

At least a part of the tongue and/or the groove may be formed in the first and the second panel respectively before a part of the tongue and/or the groove, and preferably a part of the panel, may be covered by a layer, such as a foil.

The above-described locking system allows that panels may be locked automatically perpendicularly to each other with a snap action and without any loose parts. The flexible tongue provides a strong and easy locking in middle sections and in corner sections.

The tongue is preferably factory connected but it may of course be delivered separately in blanks or as a separate loose component and inserted into a groove during installation.

The panels may not be only connectable perpendicular to each other but may also be connectable to each other at an angle of less than 180° between the main planes of the first and the second panel or preferably in the range of about 45° to about 135°.

DESCRIPTION OF EMBODIMENTS OF THE INVENTION

To facilitate understanding, several locking systems in the figures are shown schematically. It should be emphasized that improved or different functions can be achieved using combinations of the preferred embodiments.

Figure 1A:
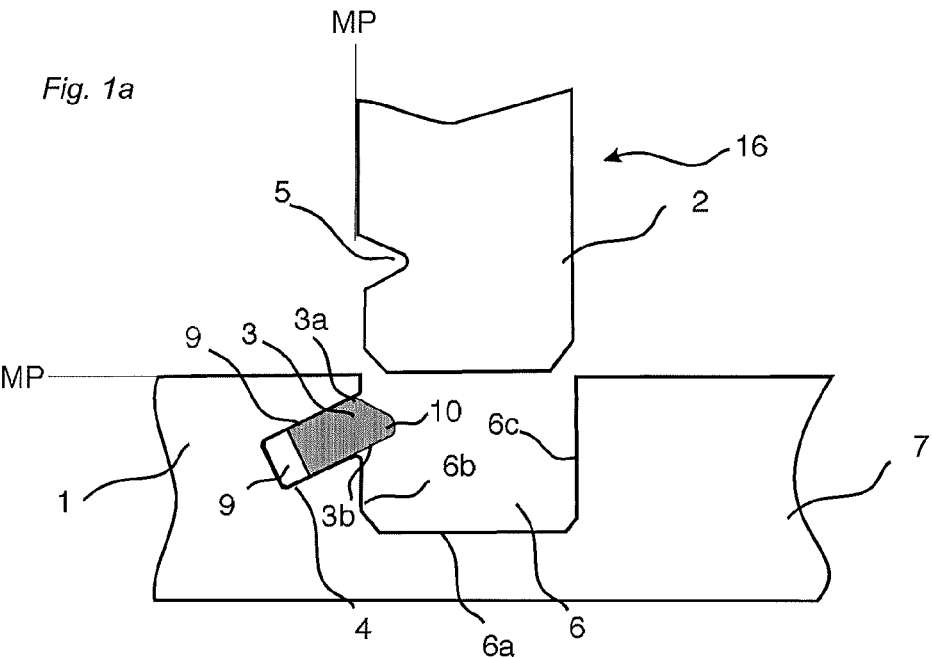
FIGS. 1a-c illustrate a perpendicular snap action of a middle section according to an embodiment of the invention.
Figure 1B:
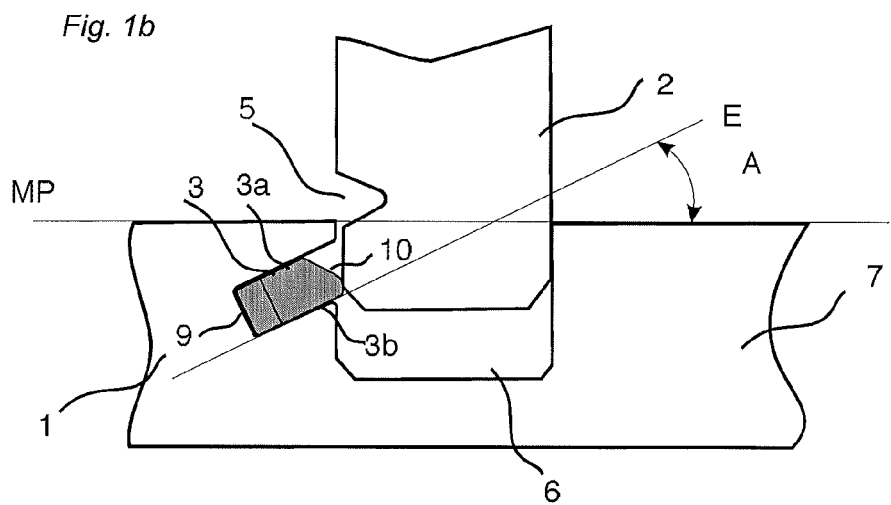
Figure 1C:
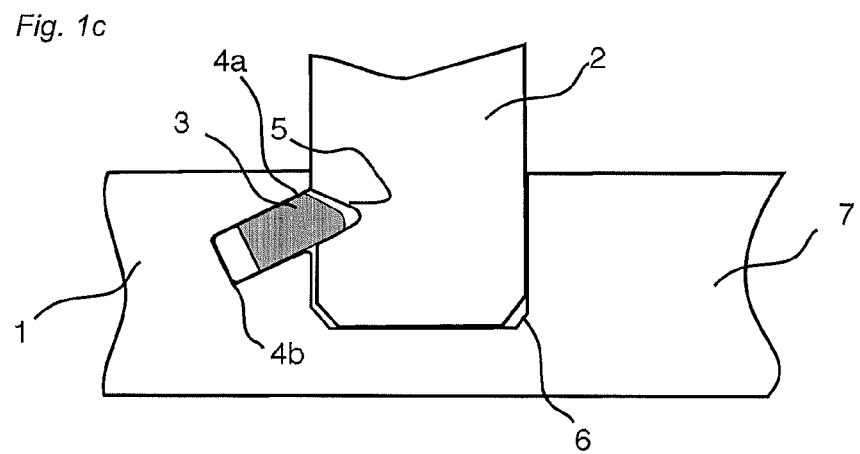

FIGS. 1a-1c show a connection with a perpendicular snap action according to a preferred embodiment of the invention. FIG. 1a shows a first 1 and a second 2 panel. The first panel 1 comprises a groove 6, formed in the panel core 7. The groove comprises a bottom 6a and two opposite groove walls 6b, 6c. The groove is open towards a main plane MP of the first panel 1. An insertion groove 4 is formed in one of the groove walls 6b. The insertion groove 4 is preferably inclined in relation to the main plane MP of the panel such that the opening of the insertion groove 4a is closer to the main plane MP than the inner part 4b. It is preferred that a linear extension E of the insertion groove extends at or more preferably above the opening of the groove 6. This makes it possible to form the insertion groove with large rotating tools and to insert a separate tongue 3 into the groove. The insertion groove is preferably inclined with an angle A of about 10-45 degrees. The insertion groove comprises a flexible tongue 3, which has an inner part 9 and an outer part 10 and preferably two opposite sliding surfaces 3a and 3b between the inner 9 and the outer 10 parts.

FIG. 1b shows how the flexible tongue 3 with its displacement surfaces 3a, 3b is displaced inwardly into the insertion groove 4 when the second panel 2 is inserted into the groove 6 perpendicularly to the first panel 1.

FIG. 1c shows how the flexible tongue 3 is displaced in the insertion groove outwardly into the tongue groove 5 such that the second panel is connected perpendicular and parallel to the first panel with preferably a snap action. The flexible tongue and the tongue groove lock the panels perpendicularly to the main plane MP of the first panel 1. The groove 6 and the edge 16 of the second panel lock the panels parallel to the main plane MP of the first panel 1. The flexible tongue 3 may be locked with pre tension into the tongue groove 5.

Figure 2A:
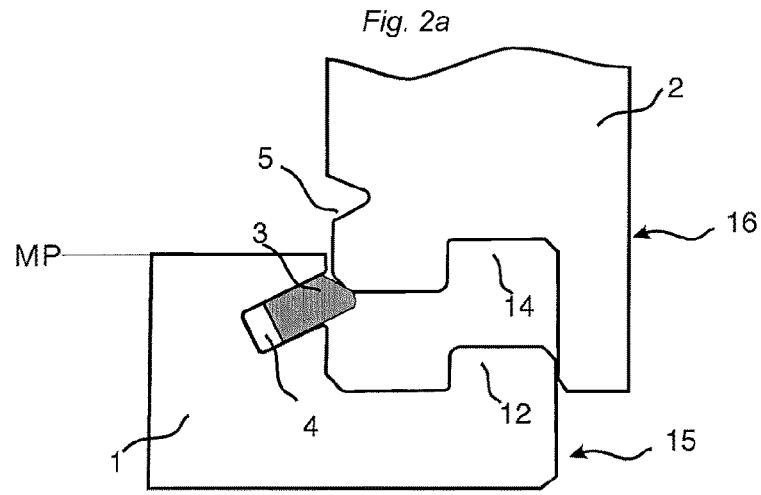
FIGS. 2a-b illustrate a corner section according to an embodiment of the invention.
Figure 2B:
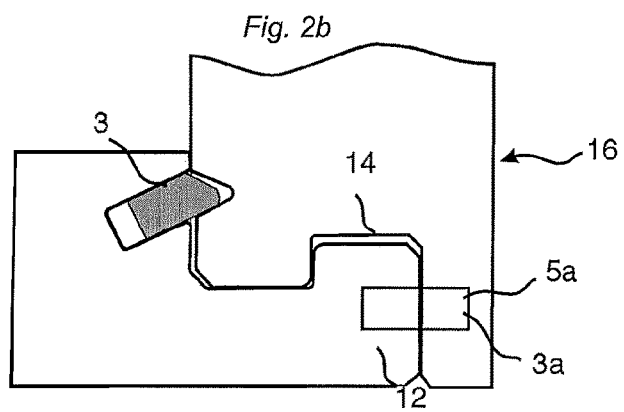

FIGS. 2a and 2b show another preferred embodiment of the invention where the edge 15, of the first panel comprises a locking element 12 and the edge 16 of the second panel comprises a locking groove 14. The locking element and the locking groove locks the panels parallel to the main plane of the first panel. This embodiment may be used to connect corner sections. A tongue and a tongue groove 5a may also be located and formed on the outer part of the locking element 12 and/or in a groove wall of the locking groove 14 as shown in FIG. 2b. There may be a space between the outer part of the locking element 12 and the locking groove, or a play or a tight fit. The insertion groove 4 may be formed in the second panel and the tongue groove 5 in the first panel. The insertion groove and/or the locking surfaces between the flexible tongue and the tongue groove may be inclined or essentially parallel to the main plane MP of the first panel.

Figure 2C:
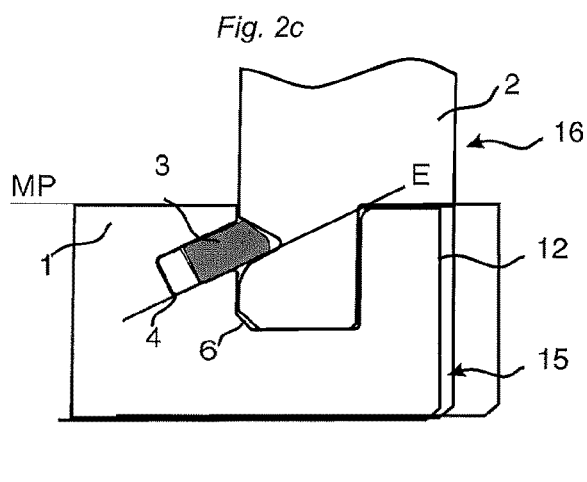
FIGS. 2c-2d illustrate corner section or middle sections according to embodiments of the invention.

FIG. 2c shows an alternative embodiment, which may be used to connect corner sections or middle sections. The edge 15, of the first panel 1, comprises a locking element 12 that in locked position forms an outer free end of the panel. The flexible tongue 3 is displaced inwardly into the insertion groove 4 when the second panel 2 is inserted into the groove 6 perpendicularly to the first panel 1. The inclination of the insertion groove 4 facilitates the insertion of the flexible tongue 3 into the insertion groove 4 during production and locking may be accomplished with lower resistance since the flexible tongue 3 slides inwardly and downwardly during locking. The insertion groove is preferably inclined such that an extension E of its lower part is located at or above the upper part of the locking element 12.

Figure 2D:
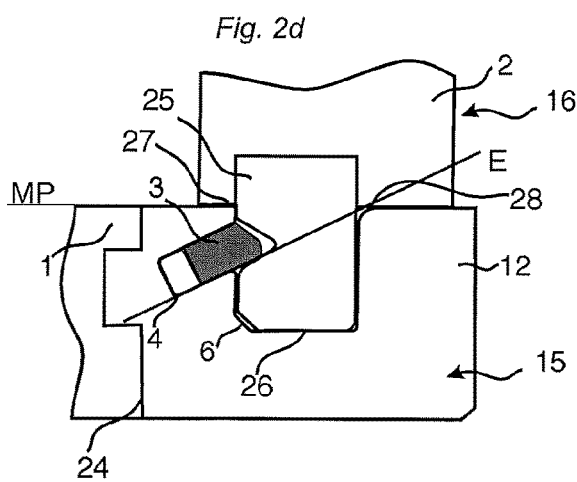

FIG. 2d shows that the second panel 2 may have an outer edge 26 with a smaller thickness than the panel body 2 such that the panel body 2 overlaps one 27 or both parts 27, 28 of the groove opening when the second panel 2 is inserted into the groove 6 of the first panel 1. The first and/or the second panel may comprise separate materials 24, 25 that form an edge or a groove portion of the first or the second panels. A particle board panel may for example be reinforced with solid wood, plywood, HDF and similar wood based materials that are glued or mechanically connected to the panel in order to form at least a part of the locking system. Separate materials may be covered with for example a foil, paper or paint.

Figure 3A:
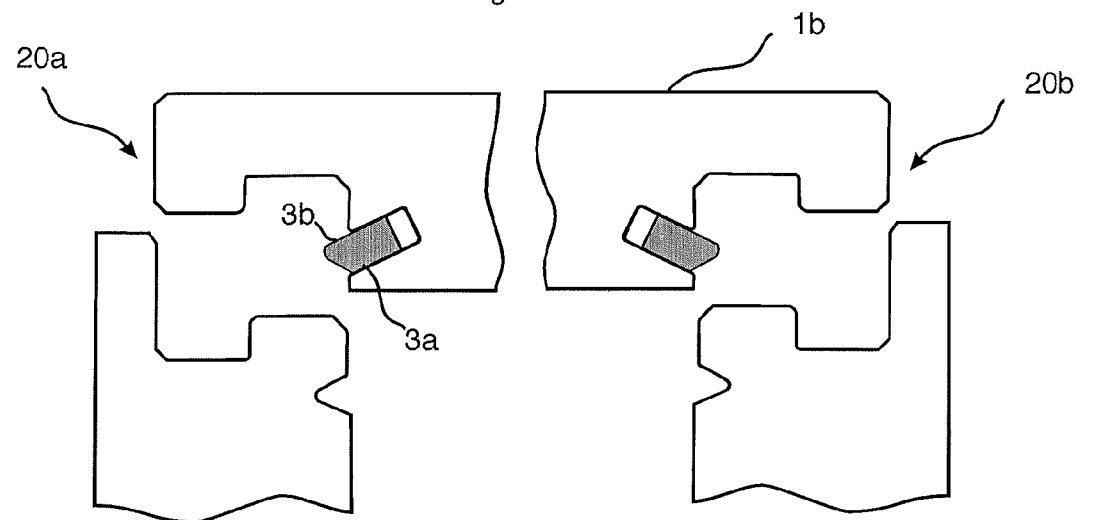
FIGS. 3a-b illustrate locking of four panels and a corner section according to embodiments of the invention.
Figure 3A:
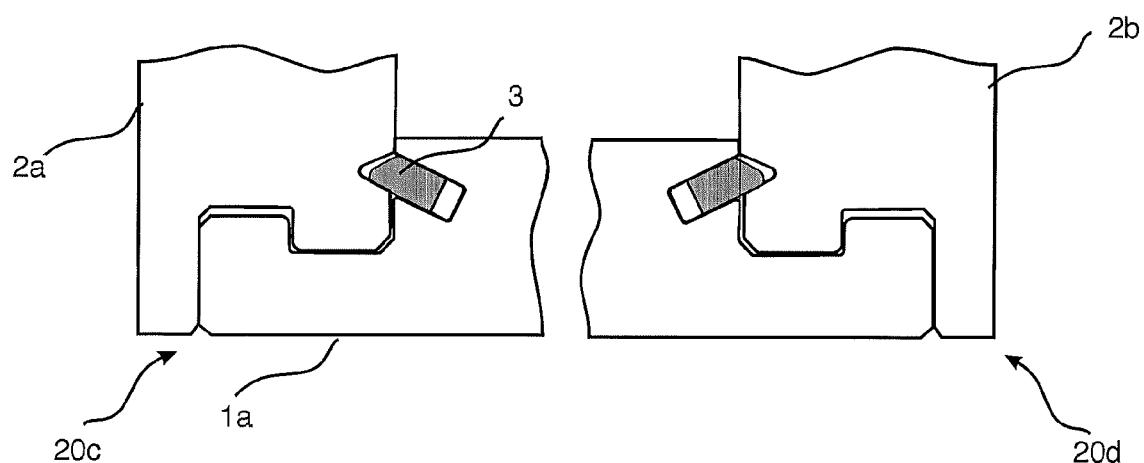

FIG. 3 shows a connection of four corner sections 20a, b, c, d. Four panels of for example a kitchen cabinet may be connected. A first panel 1a is placed on a floor. A second 2a and a third 2b panel are connected with snapping to the first panel 1a. Finally a fourth panel 1b is connected to the second and third panels.

Figure 3B:
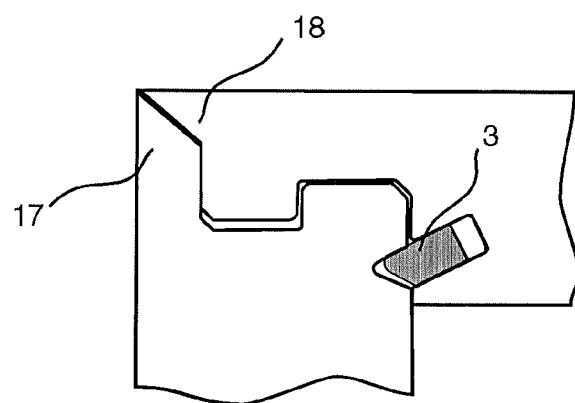

FIG. 3b shows a corner section where the adjacent panel edges 17, 18 are inclined, preferably inwardly and preferably with an angle of about 45 degrees against the main plane of the panels.

Figure 4A:
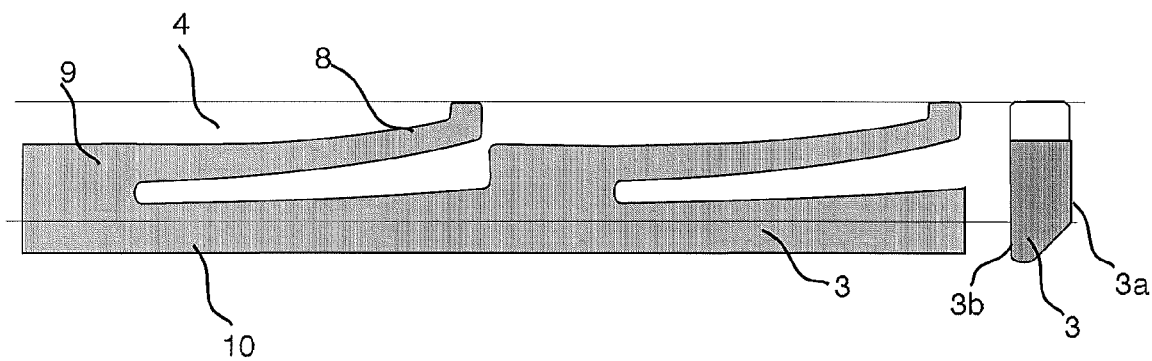
FIGS. 4a-d illustrate a bristle tongue and a bow shaped tongue according to embodiments of the invention.
Figure 4B:
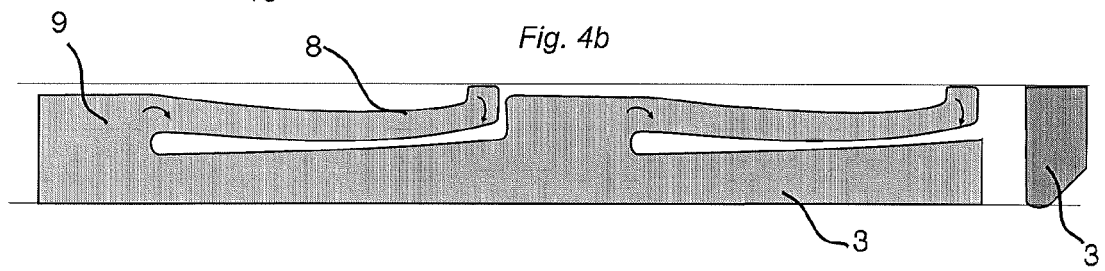
Figure 4C:
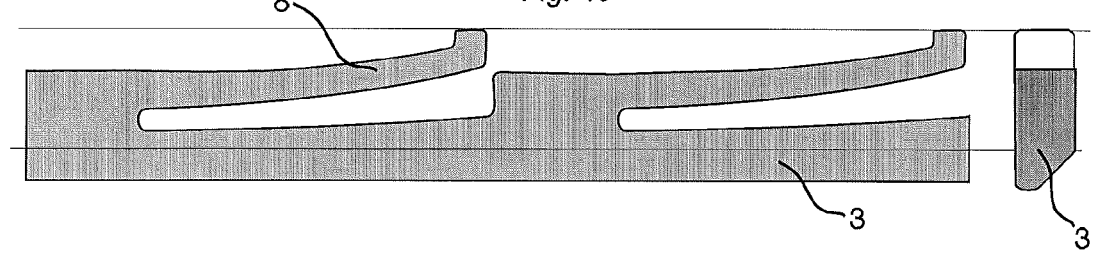

FIGS. 4a-4c show a known flexible bristle tongue 3, which is used to connect floor panels. Such a tongue may be used to connect panels according to embodiments of the invention. The tongue comprises flexible protrusions 8 that bend in the length direction of the tongue and that displace the tongue in the insertion groove during the snap action. FIG. 4a shows the tongue in the outer position prior to locking, FIG. 4b shows the tongue 3 in the inner position during locking, and FIG. 4c shows the tongue 3 in the outer and locked position.

Figure 4D:
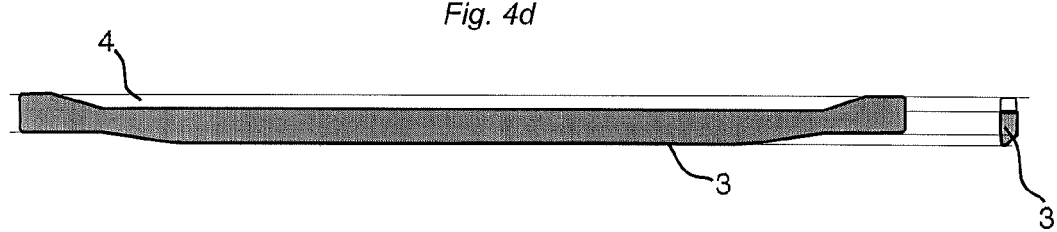

FIG. 4d shows a flexible bow shaped tongue 3 that bends in the length direction.

All known flexible tongues that are used to lock floor panels may be used in embodiments of this invention. Tongues that bend in the length direction are preferred, for example, bristle tongues and bow shaped tongues, as shown in FIGS. 4a and 4d, since such tongues have the advantage that flexibility may be combined with a rigid and strong outer part that creates a strong locking even in rather soft core materials such as particle boards that are generally used as a core in furniture components. It is an advantage if the tongue creates a pre tension against the tongue groove in locked position. This gives a stronger locking and eliminates production tolerances especially if the locking surface of the tongue/tongue groove is inclined against the main plane of the first panel. The tongue is preferably formed of an injection moulded plastic material preferably reinforced with glass fibres.

Figure 5A:
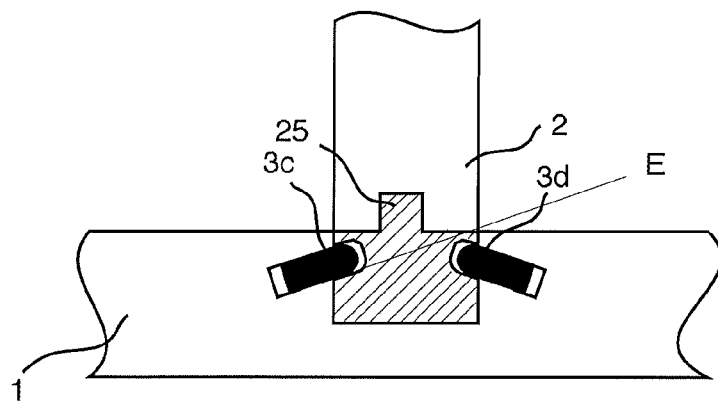
FIGS. 5a-5c illustrate embodiments of the invention.

FIG. 5a shows an embodiment with two tongues 3c,3d. The edge of the second panel 2 may comprise a separate material 25.

Figure 5B:
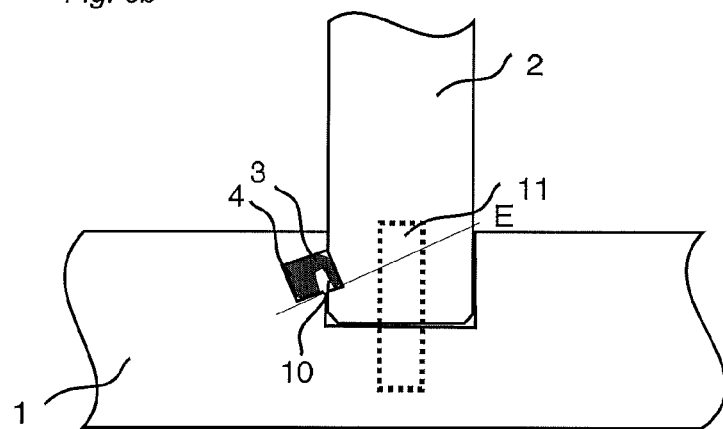

FIG. 5b shows a tongue 3 that comprise an outer part 4 with a snap tab that during snapping is displaced at least partly into an inclined insertion groove 4. The locking system comprises a stabilizing tongue 11 that may be formed in one piece with the core or inserted as a separate element.

Figure 5C:
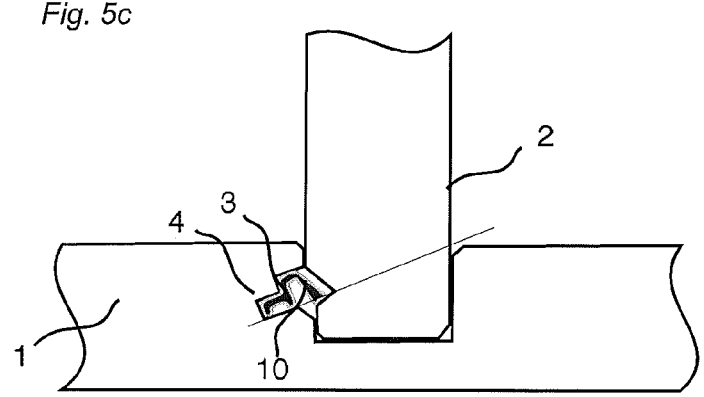

FIG. 5c shows a tongue 3 comprising a snap tab 10 that during snapping is displaced outside the insertion groove 4.

Figure 6A:
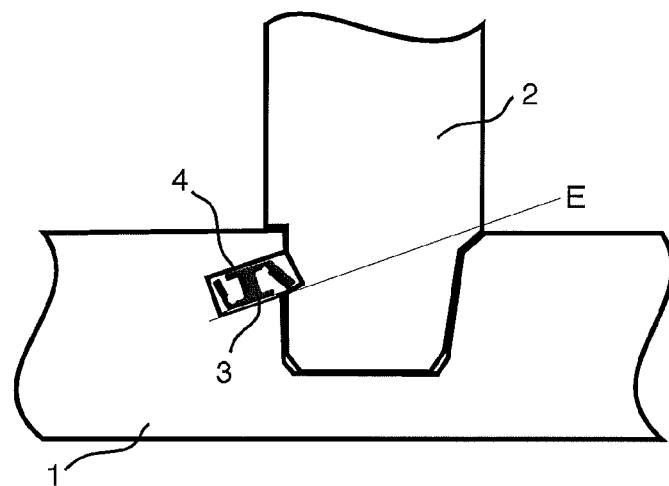
FIGS. 6a-6c illustrate embodiments of the invention.
Figure 6B:
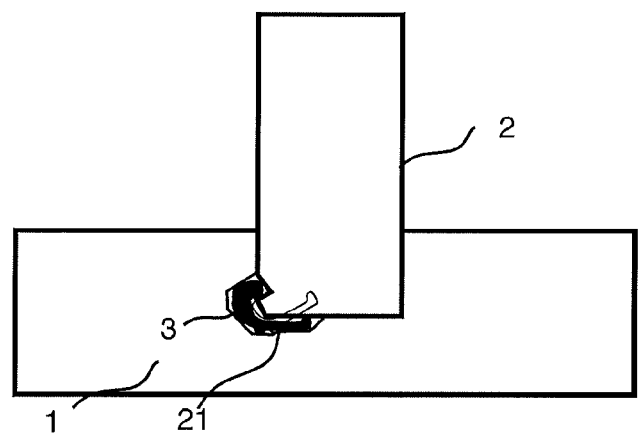

FIG. 6a shows a tongue that comprises an inner and outer flexible part. FIG. 6b shows an embodiment with a turning and snapping tongue 3 comprising a pressing arm 21 that turns and snaps the tongue 3 into a tongue groove.

Figure 6C:
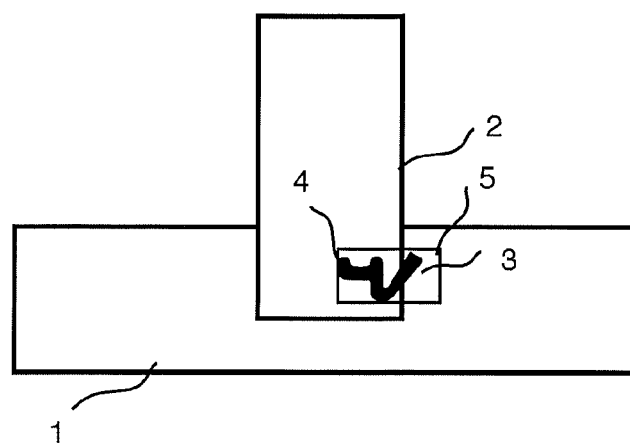

FIG. 6c shows schematically that the insertion groove 4 may be formed in the second panel 2.

Figure 7A:
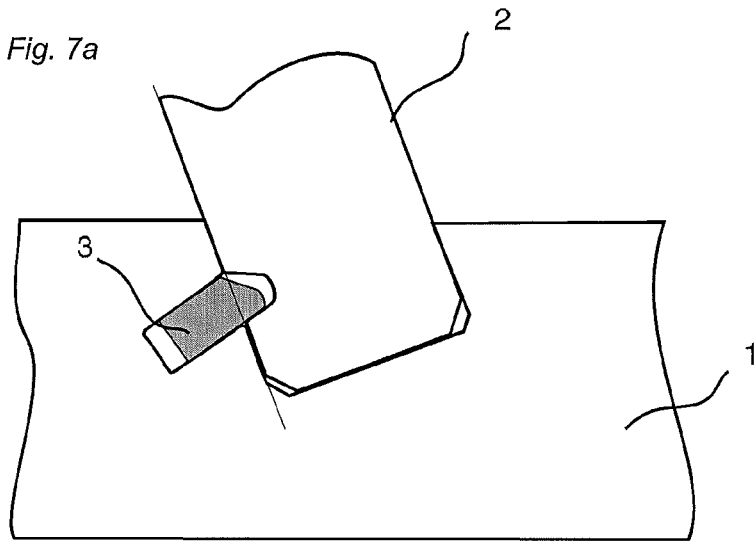
FIGS. 7a-7c illustrate embodiments of the invention.
Figure 7B:
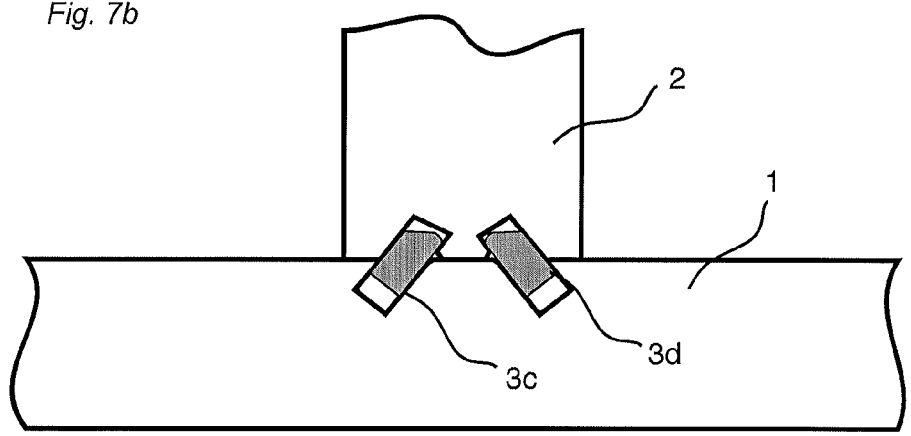
Figure 7C:
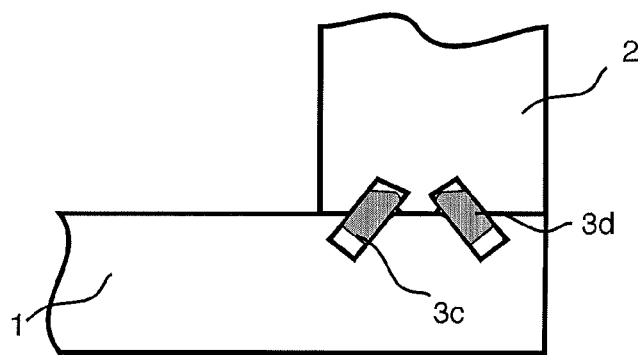

FIGS. 7a-7c show alternative positions of the flexible tongues. FIG. 7a shows that the second panel may be somewhat inclined for example 45-89 degrees against main plane of the first panel. FIG. 7b shows two tongues 3c, 3d attached to a middle section of a first panel 1 and FIG. 7c shows a corner section.

Figure 8A:
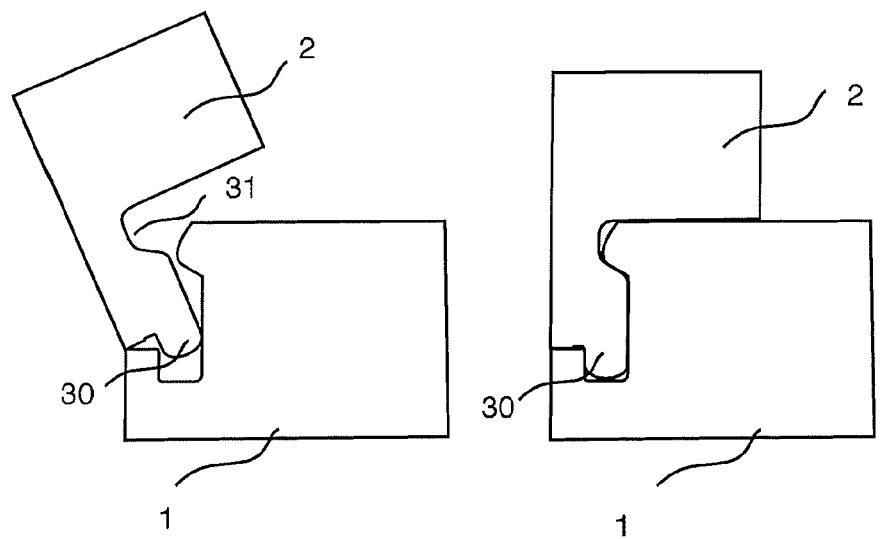
FIGS. 8a-b illustrate an angling connection according to embodiments of the invention.
Figure 8B:
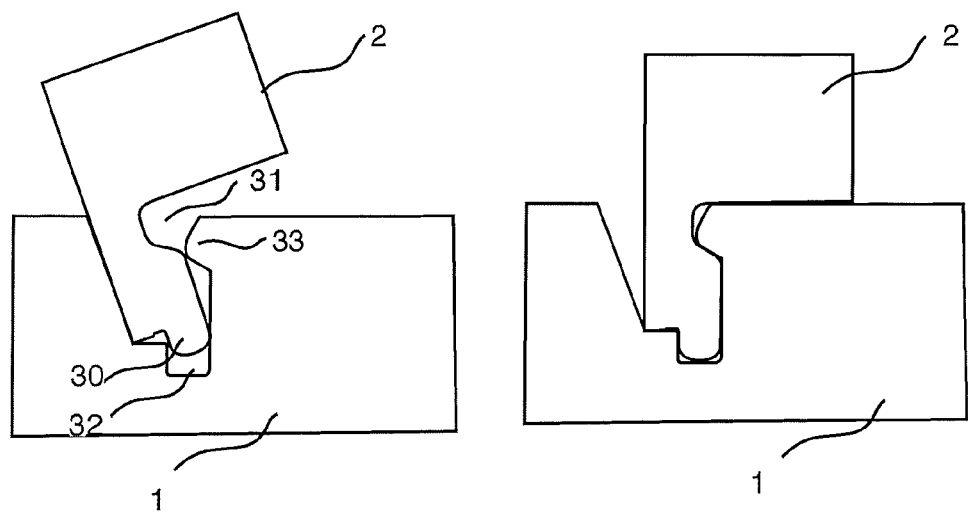

FIGS. 8a and 8b shows that two panels may be angled together according to the generally known principles used in locking systems for flooring. Such angling connection may be combined with all snapping embodiments described above. FIG. 8a shows an angling connection of a corner section and FIG. 8b shows an angling connection of a middle section. The second panel 2 that is angled during connection comprises a tongue 30 and a locking groove 31 that cooperates during locking with a tongue groove 32 and a locking element 33 formed in the first panel.

Figure 9A:
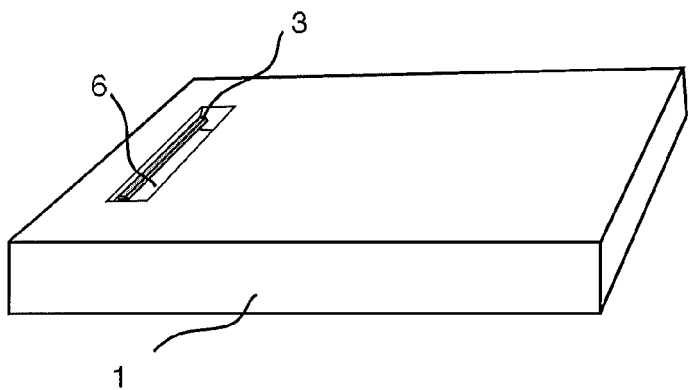
FIGS. 9a-d illustrate a partial groove and a side push tongue according to embodiments of the invention.

All fixation and tongue grooves may be formed over the complete length or with of a panel. They may also be formed as one or several local grooves, which only extend along a part of the panel. Such grooves may be formed in many ways for example with rotating jumping tool heads. Such a local groove 6 is schematically shown in FIG. 9a.

Figure 9B:
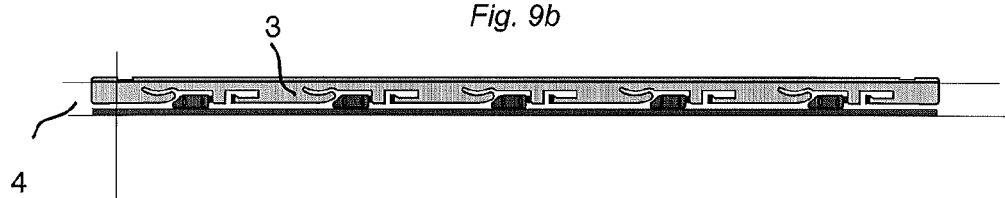
Figure 9C:
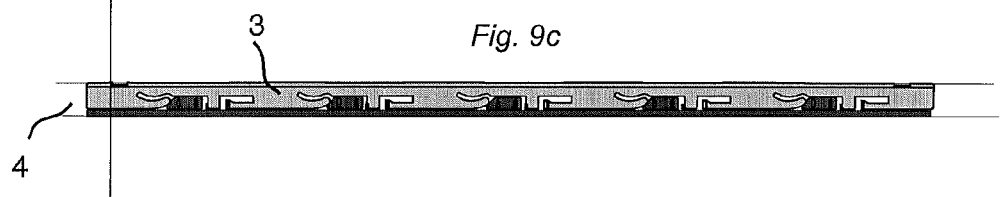
Figure 9D:
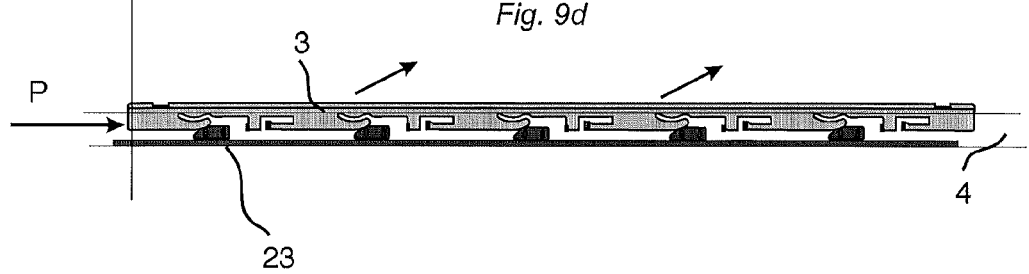

FIGS. 9b-9d show that the so-called side push locking systems may also be used to connect furniture components. Such a tongue 3 that is displaced width a side pressure P along the insertion groove 4 and perpendicularly to the insertion groove into the tongue groove may be used in all embodiments shown above. The perpendicular displacement may be accomplished with wedges 23 or with a fixation groove, which have a depth that varies along the groove. The tongue 3 and the tongue groove may also comprise overlapping protrusion and a locking may be accomplished with a displacement along the insertion groove without any perpendicular displacement into the tongue groove. Such embodiments allow locking with a rigid tongue and no flexible parts are needed.

Figure 10A:
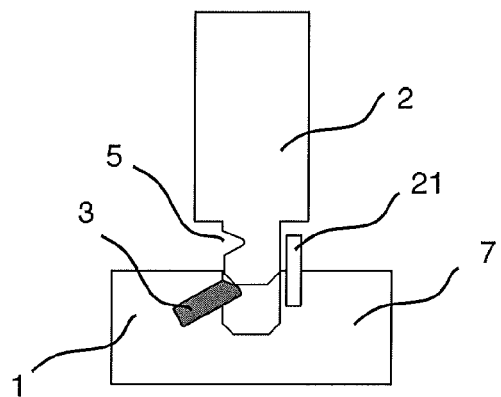
FIGS. 10a-10c illustrate embodiments of the invention.
Figure 10B:
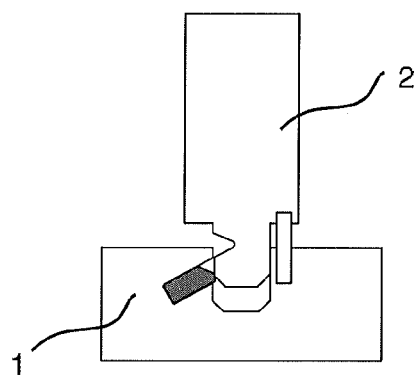
Figure 10C:
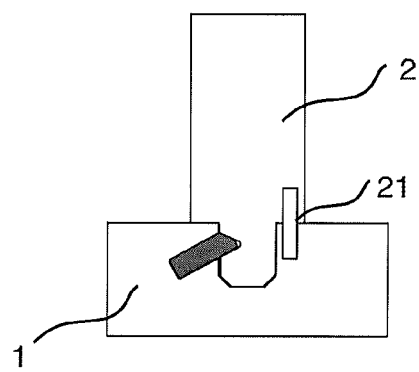

FIGS. 10a-10c show an embodiment of the invention further comprising a plug 21 of e.g. plastic, wood or metal at of the panels 1, 2 inserted into a hole, preferably at the edge of the other panel, The plug and the hole increases the strength of the connection and may be used to position the panels.

Figure 11A:
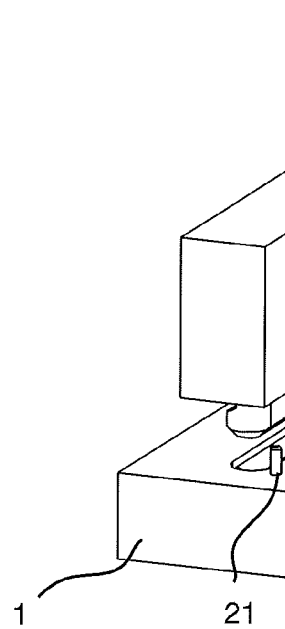
FIGS. 11a-11d illustrate embodiments of the invention in a 3d view.
Figure 11B:
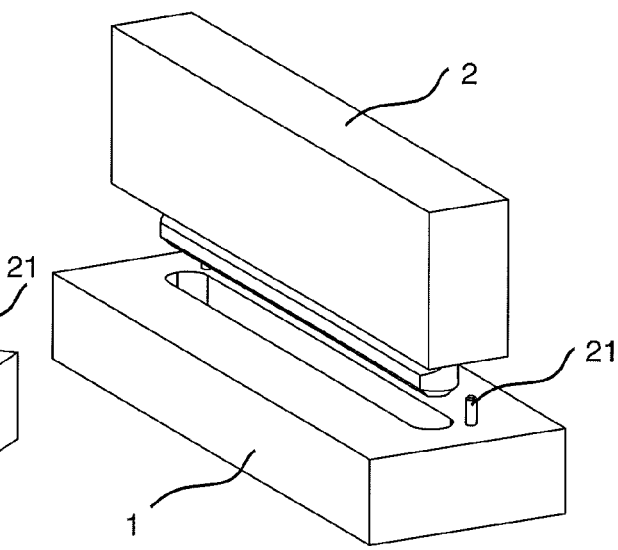
Figure 11C:
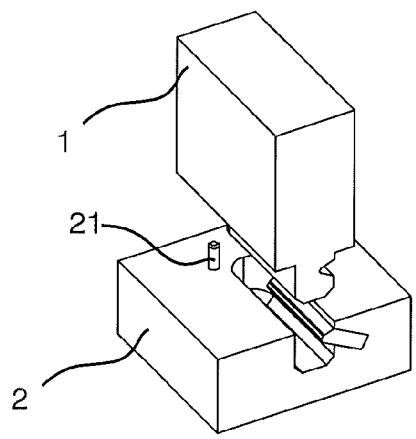
Figure 11D:
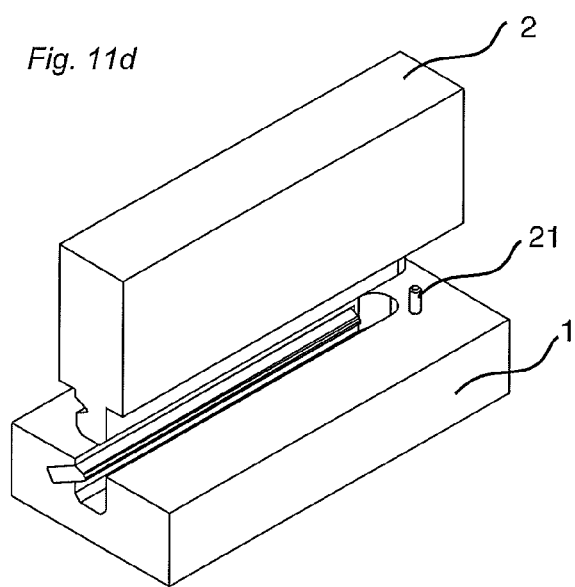

FIG. 11a-11b show the embodiment in FIG. 10a-c in a 3d view at two different angles and FIG. 11c-11d a cross section in a 3d view at two different angles.

EMBODIMENTS OF THE INVENTION

1. A set of panels (1,2) comprising a first (1) and a second panel (2), an edge (16) of the second panel is insertable into a groove (6) of the first panel (1), when the panels are arranged essential perpendicular to each other, to obtain a mechanical connection between the first and the second panel, when the second panel is displaced essentially perpendicularly to the first panel, wherein:

said edge (16) comprises a separate and flexible tongue (3) and said groove (6) comprises a tongue groove (5), or said edge (16) comprises a tongue groove (5) and said groove (6) comprises a separate and flexible tongue (3);

the separate and flexible tongue (3) is insertable into the tongue groove (5) for connecting said panels to each other in a first direction, which is parallel to a main plane (MP) of the first panel;

the edge (16) of the second panel is configured to cooperate with the groove (6) of the first panel for connecting said panels to each other in a second direction, which is parallel to a main plane (MP) of the second panel;

the length direction of the separate and flexible tongue (3) extends parallel with said edge and/or groove;

the groove (6) comprises an opening, two side walls (6b, 6c) and a bottom (6a);

the separate and flexible tongue (3) is arranged in an insertion groove (4);

the separate and flexible tongue has an inner part (9) mounted in the insertion groove (4) and an outer part (10) extending outside an opening of the insertion groove; and the flexible tongue is displaceable inwardly towards a bottom of the insertion groove (4) and outwardly into the tongue groove (5) during locking.

2. The set of panels as recited in embodiment 1, wherein the flexible tongue has two opposite displacement surfaces (3a, 3b) located between the inner and the outer parts, each of the two opposite displacement surfaces of the flexible tongue (3) are displaceable against an upper and a lower wall respectively of the insertion groove during locking, inwardly towards the bottom of the insertion groove (4) and outwardly into the tongue groove (5).

3. The set of panels as recited in embodiment 1 or 2, wherein the said insertion groove (4) is inclined upwards with the opening closer to the main plane (MP) of the panel than the inner part insertion groove (4).

4. The set of panels as recited in any of the preceding embodiments, wherein the insertion groove (4) is inclined such that an extension E of its lower part is located at or above the upper part of the opening of the groove (6).

5. The set of panels as recited in any of the preceding embodiments, wherein the second panel comprises an outer edge with a smaller thickness than the panel body (2) such that the panel body overlaps one or both parts of the groove (6) opening (27, 28) when the second panel (2) is inserted into the groove (6) of the first panel (1).

6. The set of panels as recited in any of the preceding embodiments, wherein the inner part of the tongue (9) comprises one or several flexible protrusions (8) extending in the length direction of the tongue (3).

7. The set of panels as recited in any of the preceding embodiments, wherein the insertion groove (4) is formed in the groove (6) of the first panel (1).

8. The set of panels as recited in any of the preceding embodiments, wherein the insertion groove (4) is inclined in relation to the main plane of the second panel with an angle of about 10-45 degrees.

9. The set of panels as recited in any of the preceding embodiments, wherein the panels comprises at least two flexible tongues separated from each other.

10. The set of panels as recited in any of the preceding embodiments, wherein the groove (6) is formed as a partial groove extending along a part of a panel.

11. The set of panels as recited in any of the preceding embodiments, wherein the panels are provided with a locking element (12) and a locking groove (14) for locking the panels parallel to the main plane (MP) of the first panel (1).

12. The set of panels as recited in any of the preceding embodiments, wherein adjacent outer panel edges (17,18) in a corner portion are inclined inwardly against the main plane (MP) of the panels.

13. The set of panels as recited in any of the preceding embodiments, wherein the tongue (3) is locked with pre tension against the tongue groove (5).

14. The set of panels as recited in any of the preceding embodiments, wherein the resilient parts are formed of an injection moulded plastic material.

15. The set of panels as recited in any of the preceding embodiments, wherein the first and/or the second panel comprise separate materials (24, 25) that form an edge or a groove portion.

16. The set of panels as recited in embodiment 15, wherein the separate material is covered with a foil.

The invention claimed is:

1. A set of furniture components provided with a mechanical locking system for locking a first panel and a second panel essentially perpendicularly to each other, the mechanical locking system comprising:
 a groove provided in the first panel;
 an edge of the second panel;
 an insertion groove provided in the groove of the first panel or in the edge of the second panel;
 a tongue groove provided in the edge of the second panel or in the groove of the first panel; and
 a separate and flexible tongue provided in the insertion groove, wherein the edge of the second panel is configured to be inserted into the groove of the first panel for locking the panels to each other in a direction perpendicular to a main plane of the second panel, wherein the separate and flexible tongue is configured to cooperate with the tongue groove for locking the panels to each other in a direction perpendicular to the main plane of the first panel, wherein the insertion groove, the tongue groove, and the separate and flexible tongue are arranged and configured such that displacing the second panel essentially perpendicularly to the first panel causes the flexible tongue to be linearly displaced inwardly towards a bottom of the insertion groove and outwardly into the tongue groove during locking, and wherein the edge of the second panel or a portion of the groove of the first panel comprise(s) a separate material.

2. The set of furniture components according to claim 1, wherein the separate material of the first panel and/or the second panel is glued or mechanically connected to the second panel.

3. The set of furniture components according to claim 1, wherein the first panel and the second panel are particle board panels, wherein the separate material of the first panel and/or the second panel is separate material of the first panel and separate material of the second panel, and wherein the separate material of the first panel and the separate material of the second panel each comprise solid wood, plywood or HDF.

4. The set of furniture components according to claim 1, wherein the edge of the second panel is configured to be inserted into the groove of the first panel when main planes of the first panel and the second panel are arranged essentially perpendicularly to each other.

5. The set of furniture components according to claim 1, wherein the insertion groove is formed in a side wall of the groove of the first panel.

6. The set of furniture components according to claim 1, wherein the second panel comprises an outer edge having a smaller thickness than a panel body of the second panel.

7. The set of furniture components according to claim 6, wherein the panel body overlaps one or both parts of a groove opening when the edge of the second panel is inserted into the groove of the first panel.

8. The set of furniture components according to claim 6, wherein the separate material of the second panel forms the outer edge having a smaller thickness.

9. The set of furniture components according to claim 1, wherein the separate material of the first panel and/or the second panel is covered with a foil, paper, or paint.

10. The set of furniture components according to claim 1, wherein an inner part of the separate and flexible tongue is provided in the insertion groove and wherein an outer part of the separate and flexible tongue extends outside of the insertion groove in a locked state of the panels.

11. The set of furniture components according to claim 1, wherein the insertion groove is inclined upwards, a distance from an opening of the insertion groove to the main plane of the first panel being smaller than a distance from an inner part of the insertion groove to the main plane of the first panel, the main plane of the first panel being provided along a side surface of the first panel in which the groove is provided.

12. The set of furniture components according to claim 1, wherein the insertion groove is inclined such that a linear extension of a lower part of the insertion groove is located at or above the upper part of the opening of the groove.

13. The set of furniture components according to claim 1, wherein the separate and flexible tongue has two opposite displacement surfaces configured to be displaced against an upper wall and a lower wall of the insertion groove during locking.

14. The set of furniture components according to claim 1, wherein the separate and flexible tongue is configured to be locked with pretension against the tongue groove.

15. The set of furniture components according to claim 1, wherein the tongue groove provided in the edge of the second panel is provided in the separate material of the second panel.

16. The set of furniture components according to claim 1, wherein the insertion groove is a first insertion groove provided in a groove wall of the groove of the first panel, the tongue groove is a first tongue groove provided in the edge of the second panel, and the separate and flexible tongue is a first separate and flexible tongue, the mechanical locking system further comprising:
a second insertion groove provided in an opposite groove wall of the groove of the first panel,
a second tongue groove provided in the edge of the second panel, and
a second separate and flexible tongue provided in the second insertion groove,
wherein the second separate and flexible tongue is configured to cooperate with the second tongue groove for locking the panels to each other in the direction perpendicular to the main plane of the first panel.

17. The set of furniture components according to claim 1, wherein the mechanical locking system further comprises a plug and a hole configured to cooperate with each other.

18. A method of locking a first and a second panel, the method comprising inserting an edge of the second panel into a groove of the first panel, when the panels are arranged essential perpendicular to each other, to obtain a mechanical connection between the first and the second panel, the method comprising displacing the second panel essentially perpendicularly to the first panel,
wherein:
the edge comprises a separate and flexible tongue and the groove comprises a tongue groove, or the edge comprises a tongue groove and the groove comprises a separate and flexible tongue;
the separate and flexible tongue is insertable into the tongue groove for connecting the panels to each other in a first direction, which is parallel to a main plane of the first panel;
the edge of the second panel is configured to cooperate with the groove of the first panel for connecting the panels to each other in a second direction, which is parallel to a main plane of the second panel;
a length direction of the separate and flexible tongue extends parallel with the edge and/or groove;
the groove comprises an opening, two side walls and a bottom;
the separate and flexible tongue is arranged in an insertion groove;
the separate and flexible tongue has an inner part mounted in the insertion groove and an outer part extending outside an opening of the insertion groove; and
the displacing of the second panel essentially perpendicularly to the first panel causes the flexible tongue to be linearly displaced inwardly towards a bottom of the insertion groove and outwardly into the tongue groove during locking.

* * * * *